Figure 1:
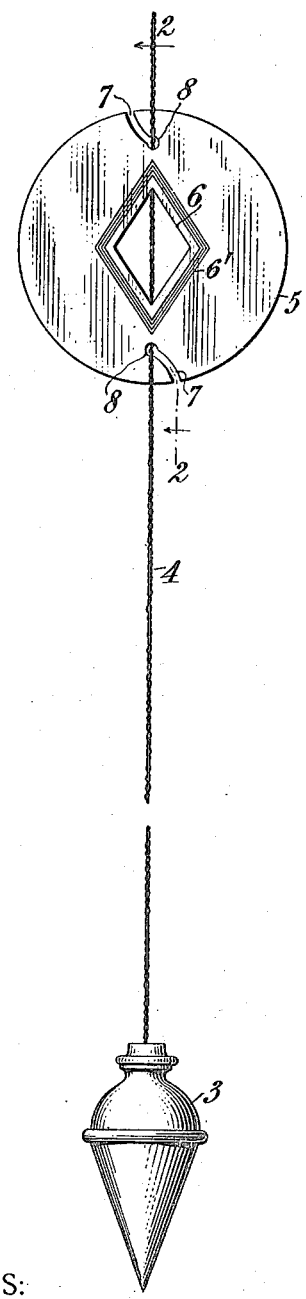

P. A. KOLESCH.
SURVEYOR'S TARGET.
APPLICATION FILED MAR. 15, 1913.

1,227,631.

Patented May 29, 1917.

WITNESSES:
René Buine
Fred White

INVENTOR :
Percy A. Kolesch,
By Attorneys,
Fraser, Burk & Myers

UNITED STATES PATENT OFFICE.

PERCY A. KOLESCH, OF BROOKLYN, NEW YORK.

SURVEYOR'S TARGET.

1,227,631. Specification of Letters Patent. Patented May 29, 1917.

Application filed March 15, 1913. Serial No. 754,538.

*To all whom it may concern:*

Be it known that I, PERCY A. KOLESCH, a citizen of the United States, and a resident of the borough of Brooklyn, county of Kings, city and State of New York, have invented certain new and useful Improvements in Surveyors' Targets, of which the following is a specification.

This invention relates to surveyors' instruments and has for an object to provide a device for attracting the vision to a plumb line or a selected portion thereof, and to provide a simple and conveniently portable target and one which may be readily carried in the pocket when not in use.

In surveying, considerable difficulty is frequently experienced in locating the plumb line, particularly when this is at some distance from the instrument, and in all cases time and energy are saved when the exact location of the line is instantly and unhesitatingly observed.

In the drawing accompanying this specification one practicable embodiment of my invention is illustrated, wherein—

Figure 2:
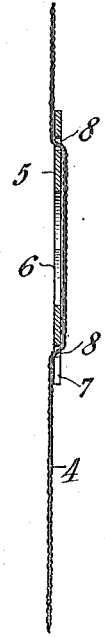

Figure 1 represents a plumb bob with attached plumb line upon which line a target embodying my invention is shown applied, and Fig. 2 is a cross section of the target showing the plumb line in position thereon, the section line of this view being indicated at 2—2 in Fig. 1.

The plumb bob is illustrated at 3 to which is attached a plumb line 4. The plumb line may be held in the hand or supported by some suitable instrument as the case may require. Upon the plumb line there is shown mounted one form of my improved target, which in the present showing comprises a disk 5 which is preferably made of some sheet material. The sheet material is preferably light and may be metal, paper, celluloid, wood or any other suitable material. Means are provided upon the target whereby the same may be readily attached to and detached from the plumb line for the purpose of holding this in some definite relation to a marked portion of the target. In the present illustration the target is provided with a hole 6, the edges of which constitute such marked portion. The hole is given a formation whereby its edges will assist the vision in accurately locating the position of the line, such formation in the present instance being lozenge-shape, the longest axis thereof being coincident with the line.

The face of the target will have some distinctive color suitable to the character of the work, or it may be white as in the present illustration. A series of black lines 6' disposed adjacent the opening 6 and conforming in shape thereto is shown for further assisting the vision in rapid location of the plumb line.

The illustrated line-engaging means carried by the target comprises a pair of tongues 9 formed by slots 7 cut inwardly from the edge of the body 5 and having their ends located on a line with the predetermined plumb line position. In the present illustration the ends 8 of the slots 7 are in line with the longest axis of the opening 6. By this means the target may be readily applied to the plumb line and removed therefrom as occasion may demand. The slots are shown somewhat curved and the end portions 8 enlarged. It will be seen that the tongues engage the plumb line and hold the same in position to be visible across the opening in the target.

The target has sufficient hold on the line to remain in whatever position it is placed, but it may be moved up and down by removing the tension of the line.

It will be readily seen that the target is one which may be carried in the pocket when not in use, and that it may be instantly applied to the plumb line whereupon the person seeking to find the position of the line will have his vision instantly directed to such line by the general face of the target and will have his vision particularly directed to the plumb line by means of the spot thereon.

The face of the target will in some instances be brought into the proper plane for the vision of the surveyor by the man who is operating the line taking hold of the target and turning it. He will also at times hold the top edge of the target and the line between his thumb and finger, thus getting the target in the proper plane as well as at the proper height.

Although but one form of the invention is illustrated it will be apparent that changes may be made within the scope of the claim without departing from the spirit of the invention.

What is claimed is:—

A disk having a centrally disposed lozenge shaped opening and means for holding a plumb line coincident with the longest axis of such opening.

In witness whereof, I have hereunto signed my name in the presence of two subscribing witnesses.

PERCY A. KOLESCH.

Witnesses:
CHAS. LYON RUSSELL,
RENÉ BRUINE.